May 20, 1969 — F. A. LECH — 3,444,962
ENERGY DISSIPATING DEVICE
Filed June 14, 1967 — Sheet 1 of 2
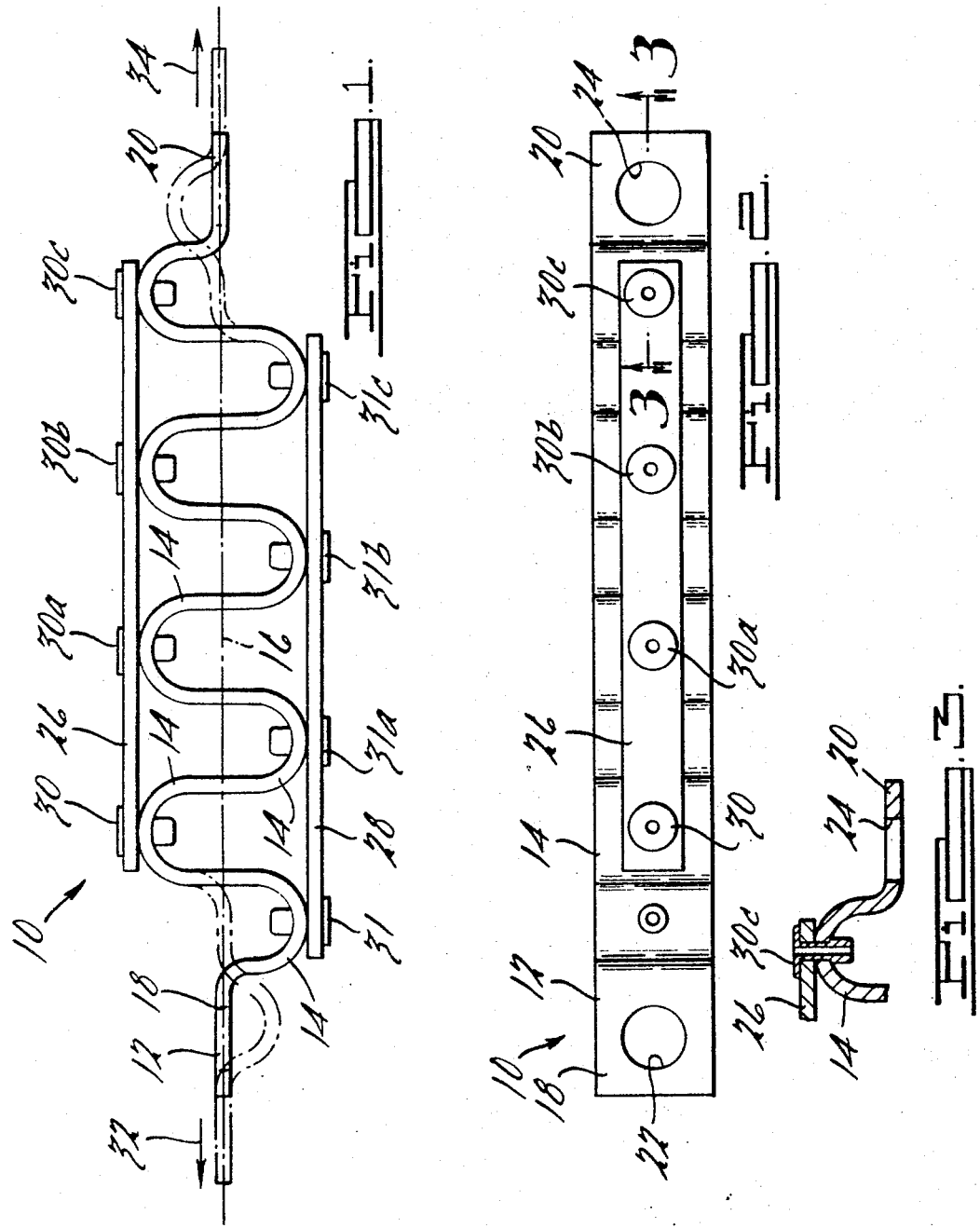
INVENTOR.
Frederick A. Lech
BY John R. Faulkner
E. Dennis O'Connor
ATTORNEYS.

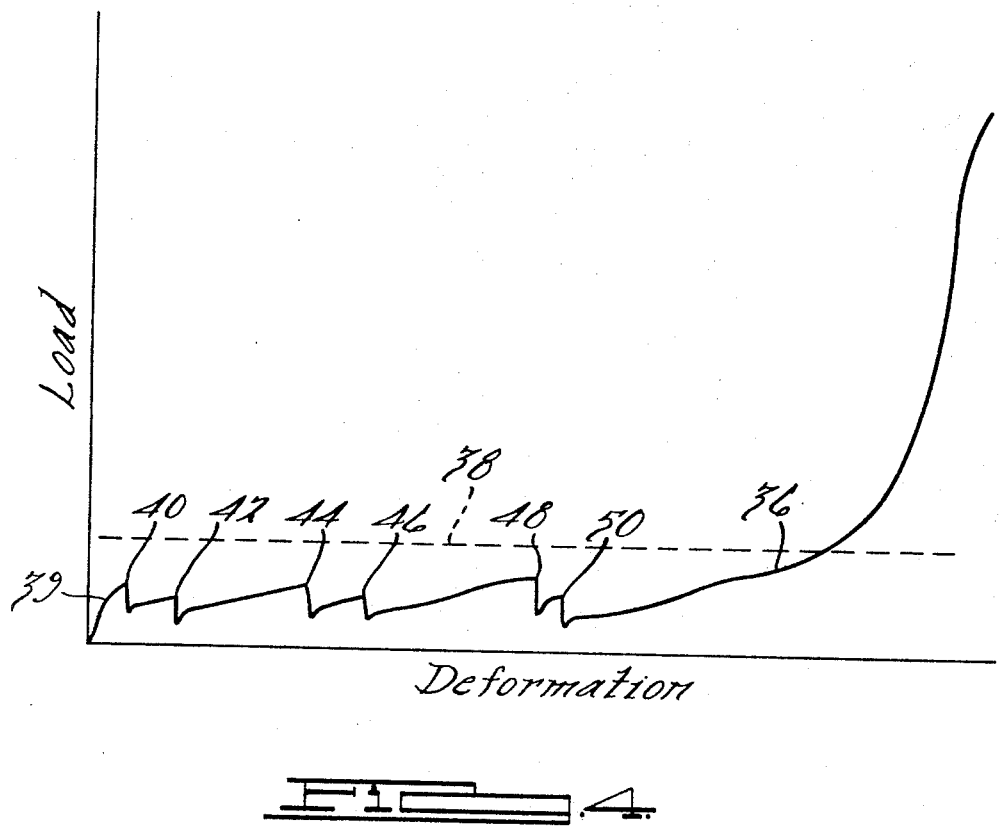

United States Patent Office 3,444,962
Patented May 20, 1969

3,444,962
ENERGY DISSIPATING DEVICE
Frederick A. Lech, Melvindale, Mich., assignor to Ford Motor Company, Dearborn, Mich., a corporation of Delaware
Filed June 14, 1967, Ser. No. 645,937
Int. Cl. F16d *63/00;* B60r *21/10;* A47d *15/00*
U.S. Cl. 188—1                                                 9 Claims

ABSTRACT OF THE DISCLOSURE

A waved expander energy dissipating device adapted for use in a motor vehicle passenger restraint system. The device includes an elongated metal strap having a shape including a plurality of similar waves extending transversely on both sides of the longitudinal axis of the strap. On both sides of the strap are positioned elongated restraining members that are secured to the apexes of the waves by rivets. Upon a longitudinal tensile or compressive force being applied to the strap, the ultimate shear strength of the rivets is substantially the same as the ultimate bending load of the individual waves.

Background of the invention

Various energy dissipating or absorbing devices that may be classified as shock attenuators are known in the prior art. Such devices usually are designed to operate on the principle of absorbing energy by deforming a working material. The working material employed in shock attenuation may comprise a nonelastomeric metal that absorbs energy by being stretched beyond its yield point, whereby the metal becomes permanently stretched and does not return to its original length when the shock load is released.

Motor vehicle design interest has focused on such devices for use in vehicle passenger restraint systems such as seat belts and/or shoulder harnesses. During a vehicle crash situation wherein the passenger is thrown forward violently against restraints, a shock attenuator device anchoring the restraints could absorb energy such that the loads imposed on the body of the passenger due to sudden movement against the restraints are reduced greatly.

An energy dissipating device or shock attenuator capable of performing satisfactorily in the environment of a vehicle passenger restraint system must be capable of absorbing large amounts of energy. The yield point of the nonelastomeric material must be predictable and it must yield at a nearly constant force level, this force level being within the safety limits of human endurance, for a minimum displacement of several inches. Also, vehicle packaging considerations dictate that usch a device be relatively compact.

This invention provides an energy dissipating device adapted for use in a motor vehicle passenger restraint system and having the requisite characteristics of such a device as detailed above.

Summary of the invention

An energy dissipating device constructed in accordance with this invention comprises an elongate sinuous member formed from nonelastomeric material and having a shape defining a plurality of similar waves extending transversely on both sides of the longitudinal axis of the sinuous member. On both sides of the sinuous member are positioned elongated restraining elements secured to the apexes of the waves by fastening means. Upon a longitudinal tensile or compressive force being applied to the sinuous member, the ultimate shear strength of the fastening means is substantially the same as the ultimate bending load of each of the waves.

Description of the drawings

FIGURE 1 is a side elevation view of an energy dissipating device constructed in accordance with this invention;

FIGURE 2 is a top view of the energy dissipating device of FIGURE 1;

FIGURE 3 is a sectional view taken along the line 3—3 of FIGURE 2; and

FIGURE 4 is a plot of the relationship between an axial-tensile force applied to the energy dissipating device of FIGURE 1 and the axial deformation of said device.

Detailed description of the invention

Referring now in detail to the drawings, the numeral 10 denotes an energy dissipating device constructed in accordance with this invention. This device includes an elongated metal strap 12 formed into a sinuous form that includes a plurality of similar waves 14 extending transversely in a symmetrical manner from either side of longitudinal axis 16 of strap 12. The strap includes axially extending ends 18 and 20 having formed therethrough mounting holes 22 and 24 respectively.

An elongated restraining element 26 is positioned substantially parallel to axis 16 and is secured to the apexes of waves 14 on one side of strap 12 by rivets 30, 30a, 30b and 30c. A similar restraining element 28 is positioned on the opposite side of strap 12 and is secured in like manner by rivets 31, 31a, 31b, and 31c. Strap 12 and the various rivets are constructed such that the ultimate shear strength of the rivets is substantially equal to the ultimate bending load of the individual waves 14. This force value will be the force level maintained by device 10 as it performs its energy dissipating function.

Upon axial tensile forces being applied to energy dissipating device 10 as illustrated by the arrows 32 and 34, a progressive shearing of the rivets and bending deformation of waves 14 will occur as illustrated by the ghost position of end portions of strap 12 illustrated in FIGURE 1. This progressive shearing and bending will continue if the tensile forces are maintained until all the rivets are sheared and strap 12 assumes an essentially straight line configuration. Obviously, compression forces applied to energy dissipating device 12 will result in a similar shearing of the connecting rivets and a bending of strap waves 14 towards one another.

A graphic illustration of the operation of this device is provided by the plot of FIGURE 4 wherein the ordinate is the load or tensioning force applied to device 10 and the abscissa is the deformation of the device as measured along its longitudinal axis 16. For purposes of illustration, it may be assumed that the curve 36 is a typical indication of the performance of device 10 when one end 18 of said device is secured to the floor of a motor vehicle passenger compartment and the other end 20 of the device is secured to a lap belt of the vehicle passenger restraining system and the passenger is thrown forward violently against the lap belt during a vehicle crash. Dotted line 38 illustrates the impact loading force safely tolerated by the human body.

During the vehicle crash, as the vehicle comes to an abrupt halt or rapidly decelerates and the vehicle passenger is thrown forward violently against the lap belt, a slight axial deformation of device 10 occurs simultaneously with a sudden increase in the load applied to the device and also borne by the passenger. This is illustrated by portion 39 of curve 36. As the load on the device 10 and the vehicle passenger approaches line 38, however, the force load becomes sufficiently great to shear a rivet, an occurrence indicated by point 40 of curve 36. The shearing of a rivet is followed by substantial drop in the load. A rapid increase in the load following the shearing of the rivet is prevented by the energy dissipating capabilities of a wave 14 as the bending of one such wave occurs. The gradual increase in loading culminates in the shearing of a second rivet, illustrated at point 42 of curve 36, and the process is repeated through a series of rivet shearings illustrated by points 44, 46, 48 and 50. Following the shearing of all rivets and a substantial bending of strap 12 into a straight line position, a sudden increase in loading occurs. If a sufficient number of waves 14 are formed on strap 12 and a sufficient number of rivets are present in the device, however, the vehicle passenger has safely come to rest before the intersection of curve 36 and line 38.

From FIGURE 4, it may be seen that the axial load applied to energy dissipating device 10 by the contact between the vehicle passenger and the restraining membeh such as a seat belt substantially is constent during the majority of the deformation of device 10. Maintenance of this loading within a safe level for human tolerance is dependent, of course, upon the material from which strap 12 and the rivets are formed, as well as the number and magnitude of waves 14. These parameters easily may be determined empirically for a particular vehicular application of the energy dissipating device. It thus may be seen that this design of energy dissipating device utilizes the energy dissipating capabilities of a series of curved beams (waves) in bending with rivets in shear to give a substantially constent loading during the majority of axial deformation of the device. The device has a predictable yield point and axial displacement is limited only by the dimensions of the particular device constructed.

I claim:

1. An energy absorbing device comprising: an elongate sinuous member formed from nonelastomeric material, at least one elongate retainer member, a plurality of distinct fastener means securing said retainer member to said sinuous member such that a predetermined elongation of said sinuous member is accompanied by a shearing of at least one of said fastener means.

2. The device according to claim 1, wherein the force required to shear said fasteners is substantially the same as the ultimate bending load force of said sinuous member applied as a tensile or compressive force along the length of said sinuous member.

3. The device of claim 1, wherein said fasteners are rivets.

4. The device of claim 1, wherein said material is cold rolled steel.

5. The device of claim 1, wherein said sinuous member includes a series of similar waves symmetrical about the longitudinal axis of said sinuous member.

6. The device of claim 5, including two retainer members, raid retainer members secured to opposite sides of said sinuous members by said fasteners at the apex of each waves.

7. The device of claim 6, wherein said fasteners are rivets.

8. An energy absorbing device comprising: an elongate deformable member constructed or nonelastomeric material and having a shape including a plurality of waves extending transversely relative to the longitudinal axis of said member, an elongate retaining element arranged substantially parallel to said longitudinal axis and secured to more than one of said waves at the apexes of said waves by a plurality of distinct fasteners, said member and said fasteners constructed such that upon a longitudinal tensioning force being applied to said member one of said waves will deform and one of said fasteners will shear substantially simultaneously.

9. The device according to claim 8, wherein said waves are formed substantially symmetrically about said longitudinal axis, and including a second retaining element arranged parallel to said axis on the side of said member remote from said first retaining element, said second element secured to the apexes of a plurality of waves by fasteners.

References Cited

UNITED STATES PATENTS 2,165,274  7/1939  Kessenich.

DUANE A. REGER, *Primary Examiner.*

U.S. Cl. X.R.

297—386